(12) United States Patent
Dong

(10) Patent No.: US 12,526,841 B2
(45) Date of Patent: Jan. 13, 2026

(54) INFORMATION SENDING METHOD, INFORMATION SENDING APPARATUS, AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 318 days.

(21) Appl. No.: 17/999,124

(22) PCT Filed: May 20, 2020

(86) PCT No.: PCT/CN2020/091369
§ 371 (c)(1),
(2) Date: Nov. 17, 2022

(87) PCT Pub. No.: WO2021/232308
PCT Pub. Date: Nov. 25, 2021

(65) Prior Publication Data
US 2023/0199843 A1    Jun. 22, 2023

(51) Int. Cl.
*H04W 4/00*   (2018.01)
*H04W 16/28*  (2009.01)
(Continued)

(52) U.S. Cl.
CPC ....... *H04W 74/0816* (2013.01); *H04W 16/28* (2013.01); *H04W 72/1263* (2013.01); *H04W 74/0875* (2013.01)

(58) Field of Classification Search
CPC ............. H04W 74/0816; H04W 16/28; H04W 72/1263; H04W 74/0875; H04W 74/0808; H04W 16/14; H04B 7/06952; H04B 7/088
See application file for complete search history.

(56) References Cited

U.S. PATENT DOCUMENTS 11,751,073 B2 *  9/2023  Yerramalli ............ H04W 16/28
                                                        370/329
2017/0238294 A1 *  8/2017  Lim ....................... H04L 5/0062
                                                        370/277
(Continued)

FOREIGN PATENT DOCUMENTS

CN    106374984 A    2/2017
CN    109391949 A    2/2019
(Continued)

OTHER PUBLICATIONS

International Search Report issued Feb. 22, 2021 in PCT/CN2020/091369 filed on May 20, 2020, 4 pages (with English Translation).
(Continued)

*Primary Examiner* — Edan Orgad
*Assistant Examiner* — Hidayat Dabiri
(74) *Attorney, Agent, or Firm* — Oblon, McClelland, Maier & Neustadt, L.L.P.

(57) ABSTRACT

Disclosed are an information transmission method and device and a storage medium. The method includes: determining a plurality of beams for which clear channel assessment detection is to be performed; based on each beam of the plurality of beams, performing clear channel assessment detection in a beam direction corresponding to each beam; in response to presence of one or more beams among the plurality of beams for which the clear channel assessment detection is successful, determining a beam for transmitting information among the one or more beams for which the clear channel assessment detection is successful, and transmitting the information.

9 Claims, 5 Drawing Sheets

(51) Int. Cl.
*H04W 72/1263* (2023.01)
*H04W 74/08* (2009.01)
*H04W 74/0816* (2024.01)

(56) References Cited

U.S. PATENT DOCUMENTS

| | | | |
|---|---|---|---|
| 2019/0069303 | A1 | 2/2019 | Yerramalli et al. |
| 2019/0104416 | A1* | 4/2019 | Yerramalli ............ H04W 72/51 |
| 2019/0104546 | A1* | 4/2019 | Chendamarai Kannan ................ H04W 16/14 |
| 2020/0136714 | A1* | 4/2020 | Viorel .................... H04W 16/14 |
| 2020/0236555 | A1* | 7/2020 | Tomeba ................ H04W 16/14 |
| 2020/0236729 | A1 | 7/2020 | Ahn et al. |
| 2020/0366339 | A1* | 11/2020 | Gao ...................... H04B 7/0404 |
| 2022/0150968 | A1* | 5/2022 | Fehrenbach .......... H04W 72/23 |
| 2022/0408420 | A1* | 12/2022 | Li ............................ H04L 1/08 |
| 2023/0107283 | A1* | 4/2023 | Park ..................... H04W 48/08 370/329 |

FOREIGN PATENT DOCUMENTS

| | | |
|---|---|---|
| CN | 109690969 A | 4/2019 |
| CN | 110249657 A | 9/2019 |
| CN | 111096059 A | 5/2020 |
| CN | 111107555 A | 5/2020 |
| CN | 111133823 A | 5/2020 |
| CN | 111149416 A | 5/2020 |

OTHER PUBLICATIONS

Combined Chinese Office Action and Search Report issued Dec. 11, 2024 in Chinese Patent Application No. 202080001079.3 (with English translation), 14 pages.

Chinese Office Action dated Sep. 24, 2025; Issued in Chinese Patent Application No. 202080001079.3 (with English translation).

* cited by examiner

INFORMATION SENDING METHOD, INFORMATION SENDING APPARATUS, AND STORAGE MEDIUM

CROSS-REFERENCE TO RELATED APPLICATIONS

The present application is the U.S. National Stage of International Application No. PCT/CN2020/091369, filed on May 20, 2020, the contents of which are incorporated herein by reference in their entireties for all purposes.

TECHNICAL FIELD

The present disclosure generally relates to the communication technical field, and more particularly, to an information transmission method, an information transmission device and a storage medium.

BACKGROUND

In the discussions and designs of the R16 New Radio-Unlicensed (NR-U) standards, a transmitting end generally performs channel listening before transmitting information, and the information can be transmitted only after the channel listening is successful (i.e., the interference level on the listened channel is determined to be below a predetermined interference threshold), i.e., the transmitting end uses a listen-before-talk (LBT) channel occupancy mechanism to transmit information. The procedure of channel listening by the transmitting end is called Clear Channel Assessment (CCA). After the CCA is successful, the transmitting end can transmit information.

In order to ensure coverage and resist path loss, beam-based transmission and reception are often used. Since the spatial direction of each beam is different, the interference when performing transmission or reception on each beam is also different. In NR, a network device configures a beam for the transmitting end to use to transmit information. Before transmitting the information, the transmitting end needs to determine a transmitting beam to be used for transmitting the information in advance. When it is determined by LBT detection on this determined transmitting beam that the interference level is higher than a predetermined interference threshold, CCA is determined to be failed and the information is not transmitted.

SUMMARY

In order to address the problems existing in related arts, the present disclosure provides an information transmission method, an information transmission device and a storage medium. The technical solutions are as follows.

According to a first aspect of embodiments of the present disclosure, there is provided an information transmission method, including: determining a plurality of beams for which clear channel assessment detection is to be performed; based on each beam of the plurality of beams, performing clear channel assessment detection in a beam direction corresponding to each beam; and in response to presence of one or more beams among the plurality of beams for which the clear channel assessment detection is successful, determining a beam for transmitting information among the one or more beams for which the clear channel assessment detection is successful, and transmitting the information.

According to a second aspect of embodiments of the present disclosure, there is provided an information transmission device, including:

a determination unit configured to determine a plurality of beams for which clear channel assessment detection is to be performed, and based on each beam of the plurality of beams, perform clear channel assessment detection in a beam direction corresponding to each beam; and in response to presence of one or more beams among the plurality of beams for which the clear channel assessment detection is successful, determine a beam for transmitting information among the one or more beams for which the clear channel assessment detection is successful; and a transmitting unit configured to transmit the information based on the determined beam for transmitting the information.

According to a third aspect of embodiments of the present disclosure, there is provided an information transmission device, including:

a processor; and a memory storing instructions executable by the processor;

wherein the processor is configured to perform the information transmission method according to the first aspect or any implementation of the first aspect.

According to a fourth aspect of embodiments of the present disclosure, there is provided a non-transitory computer readable storage medium, wherein when instructions in the storage medium are executed by a processor of a mobile terminal or a network device, the mobile terminal or the network device is caused to perform the information transmission method according to the first aspect or any implementation of the first aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of devices and methods consistent with aspects related to the present disclosure as recited in the appended claims.

Figure 1:
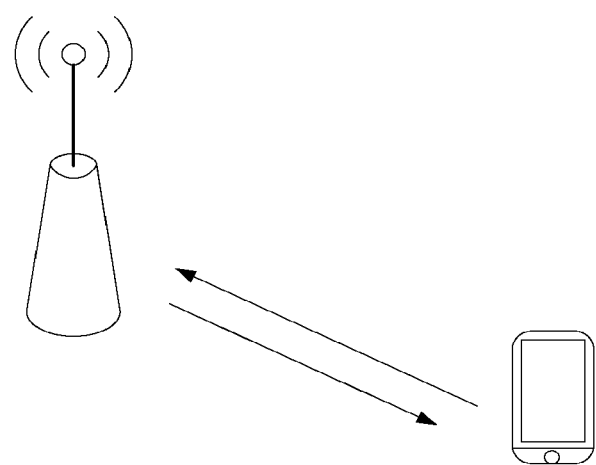
FIG. 1 is a diagram of a structure of a wireless communication system according to an example embodiment.

The information transmission method provided by embodiments of the present disclosure may be applied in a wireless communication system shown in FIG. 1. Referring to FIG. 1, a terminal and a network device are included in the wireless communication system. Information is transmitted and received between the terminal and the network device via radio resources.

It will be understood that the wireless communication system shown in FIG. 1 is only schematically illustrated, and the wireless communication system may also include other network devices, such as a core network device, a wireless relay device, and a wireless backhaul device, etc., which are not shown in FIG. 1. Embodiments of the present disclosure do not limit the number of network devices and the number of terminals included in the wireless communication system.

It is further understood that the wireless communication system of the embodiments of the present disclosure is a network that provides wireless communication functions. The wireless communication system may employ different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), or Carrier Sense Multiple Access with Collision Avoidance. Depending on the capacity, rate, and delay of different networks, the networks can be classified as a 2G (second generation) network, a 3G network, a 4G network, or a future evolved network such as a 5G network, which can also be called a New Radio (NR) network. For ease of description, the present disclosure will sometimes refer to the wireless communication network as simply network.

Further, the network device involved in the present disclosure may also be referred to as a wireless access network device. The wireless access network device may be: a base station, an evolved node B (base station), a home base station, an access point (AP) in a wireless fidelity (WiFi) system, a wireless relay node, a wireless backhaul node, a transmission point (TP), or a transmission and reception point (TRP), or a gNB in the NR system, or a component or part of devices constituting a base station, etc. The network device may also be a vehicle-mounted device when the system is a Vehicle-to-Everything (V2X) communication system. It should be understood that in the embodiments of the present disclosure, the specific technology and the specific device form used for the network device are not limited.

Further, the terminal involved in the present disclosure may also be referred to as a terminal device, User Equipment (UE), Mobile Station (MS), Mobile Terminal (MT), etc. The terminal is a device that provides voice and/or data connectivity to a user. For example, the terminal may be a handheld device with a wireless connection function, or a vehicle-mounted device, etc. Currently, some examples of the terminal are: mobile phone, Pocket Personal Computer (PPC), pocket PC, Personal Digital Assistant (PDA), laptop, tablet, a wearable device, or a vehicle-mounted device, etc. In addition, the terminal device may also be a vehicle-mounted device when the system is a Vehicle-to-Everything (V2X) communication system. It should be understood that in the embodiments of the present disclosure, the specific technology and the specific device form used for the terminal are not limited.

In related arts, before a terminal performs information transmission with a network device, one end (the network device or the terminal), which serves as the transmitting end of the information, performs CCA detection using the LBT channel occupancy mechanism, and the transmitting end transmits information after CCA detection is successful.

To ensure coverage and resist path loss, beam-based transmission and reception are usually used. In NR, a network device configures the beam used to transmit the information for the transmitting end. The transmitting end needs to determine the transmitting beam to be used for transmitting the information before information transmission. The beam used for transmitting the information may be configured by the network device. For example, the beam for the network device to transmit the Physical Downlink Control Channel (PDCCH) is semi-statically configured by the network device using Medium Access Control (MAC) signaling. The network device transmits a dynamically scheduled Physical Downlink Shared Channel (PDSCH) whose beam is specified by the network device using Downlink Control Information (DCI) that schedules the PDSCH. A beam for a semi-persistent scheduling (SPS) PDSCH transmitted by the 0 network device is semi-statically configured by the network device through Radio Resource Control (RRC) layer signaling. A beam for the Physical Uplink Control Channel (PUCCH) to be transmitted by the terminal is configured semi-statically by the network device using MAC signaling. A beam for a dynamically scheduled Physical Uplink Shared Channel (PUSCH) transmitted by the terminal is specified by the network device using DCI for scheduling the PUSCH. A beam for semi-statically configured configured grant PUSCH (CG-PUSCH) transmitted by the terminal is configured semi-statically by the network device through RRC layer signaling. The transmitting end usually has multiple transmitting beams. Since the spatial directions of the beams are different, when the transmitting end performs LBT on different transmitting beams at the same time, the interferences that can be detected on different beams are not the same. However, during the configuration of the beam for information transmission, the network device usually configures or assigns a beam in advance for transmission of one piece of information. When it is determined by LBT detection on the beam that the interference level is above a predetermined interference threshold, CCA is determined to be failed and the information is not transmitted.

In 5G systems, there is a class of service type that requires high reliability and low latency, namely, Ultra reliability low latency (URLLC) service. For the URLLC service, timely transmission is desired. If the URLLC service is transmitted on a unlicensed frequency band, it is desired to reduce the probability that the URLLC cannot be transmitted smoothly due to unsuccessful channel listening.

In view of above, embodiments of the present disclosure provide an information transmission method. In the information transmission method, a plurality of beams are determined for CCA detection. CCA detection is performed in a beam direction corresponding to each beam of the plurality of beams. Thus, the success rate of CCA detection can be improved. By transmitting information on the beam for which the CCA detection is successful, the probability of smooth information transmission can be increased.

Figure 2:
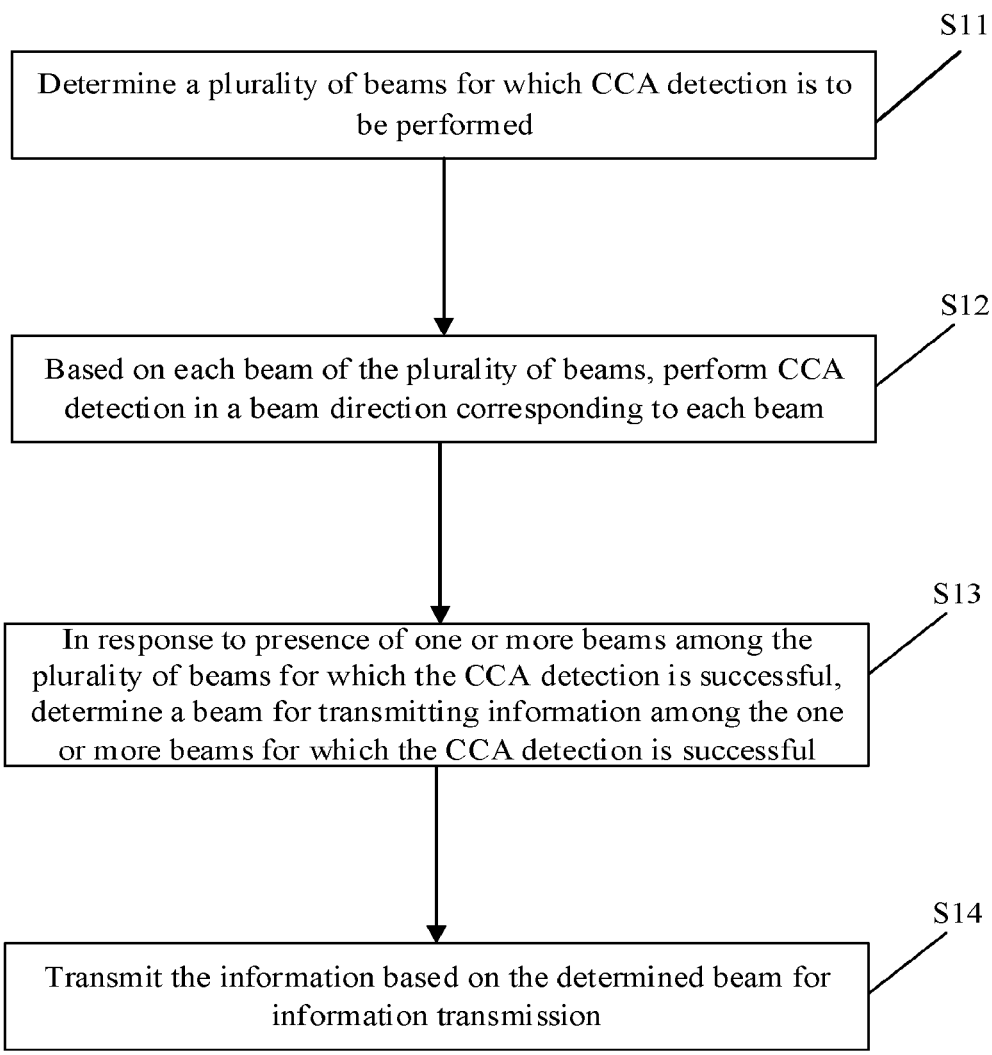
FIG. 2 is a flowchart of an information transmission method according to an example embodiment.

FIG. 2 is a flow chart of an information transmission method according to an example embodiment. As shown in FIG. 2, the information transmission method is applied in a transmitting end, which may be a terminal or a network device. The method includes the following steps.

In step S11, a plurality of beams for which CCA detection is to be performed are determined.

In an embodiment of the present disclosure, a plurality of beams for which CCA detection is to be performed may be determined before performing information transmission. A plurality of beams are used to perform CCA detection.

In an implementation, a plurality of beams are configured for each channel to be transmitted for CCA detection.

In step S12, based on each beam of the plurality of beams, CCA detection is performed in a beam direction corresponding to each beam.

In an embodiment of the present disclosure, CCA detection is performed individually for each beam of the plurality of beams for which CCA detection is determined to be performed. The CCA detection is performed for each beam in a beam direction corresponding to the beam to improve the probability of successful CCA detection.

In step S13, in response to presence of one or more beams among the plurality of beams for which the CCA detection is successful, a beam for transmitting information is determined among the one or more beams for which the CCA detection is successful.

In an embodiment of the present disclosure, CCA detection is performed using a plurality of beams in the respective beam direction corresponding to each beam, and if there is at least one beam for which CCA detection is successful, the beam for information transmission is determined among the at least one beam for which the detection is successful. The at least one beam for which CCA detection is successful may be one beam or multiple beams.

In step S14, the information is transmitted based on the determined beam for information transmission.

In the information transmission method provided in embodiments of the present disclosure, a plurality of beams are determined for CCA detection. CCA detection is performed in a beam direction corresponding to each beam of the plurality of beams. Thus, the success rate of CCA detection can be improved. By determining the beam for information transmission among the one or more beams for which CCA detection is successful and transmitting the information based on the determined beam, the probability of smooth information transmission can be increased.

The implementation process of the information transmission method involved in the above embodiments is described below with practical applications.

In an implementation, the plurality of beams for which CCA detection is to be performed in embodiments of the present disclosure may be specified or configured by the network device. It may be understood that the transmitting end may determine the plurality of beams for which CCA detection is to be performed based on the configuration information of the network device. Further, in embodiments of the present disclosure, for to-be-transmitted information, different configuration information may be used to indicate the beams for which CCA detection is to be performed. For example, the information includes information of SPS PDSCH, and the configuration information includes information configured by the RRC layer signaling. Or, the information includes information of the CG-PUSCH, and the configuration information includes information configured by the RRC signaling. Or, the information includes dynamically scheduled PDSCH, and the configuration information includes DCI scheduling the PDSCH. Or, the information includes information of PDCCH, and the configuration information includes information configured by MAC signaling or RRC signaling. Or, the information includes information of PUCCH, and the configuration information includes information configured by MAC signaling or RRC signaling.

In an implementation, there exists a priority order among the plurality of beams for which CCA detection is to be performed. The priority order of the beams may be pre-configured, for example, may be pre-configured by the network device. For example, the network device may determine the priority order based on a beam index. In an implementation, a priority order with a smaller index is higher than a priority order with a larger index.

Further, the network device may perform beam priority order adjustment. In one example, the network device configures beams including beam 1, beam 2, beam 3 and beam 4, and determines the priority order of the beams according to their indexes, i.e., the priorities of beam 1, beam 2, beam 3 and beam 4 are ordered in a descending order. In the subsequent communication procedure, it is determined that beam 3 and beam 4 are better for information transmission, and at this time, the indexes of beam 3 and beam 4 can be renumbered to be smaller than the indexes of beam 1 and beam 2, and thus the priority order of the beams can be adjusted.

In determining the beam used for information transmission, the beam for information transmission can be determined based on the priority order of the beams, among one or more beams for which CCA detection is successful.

Figure 3:
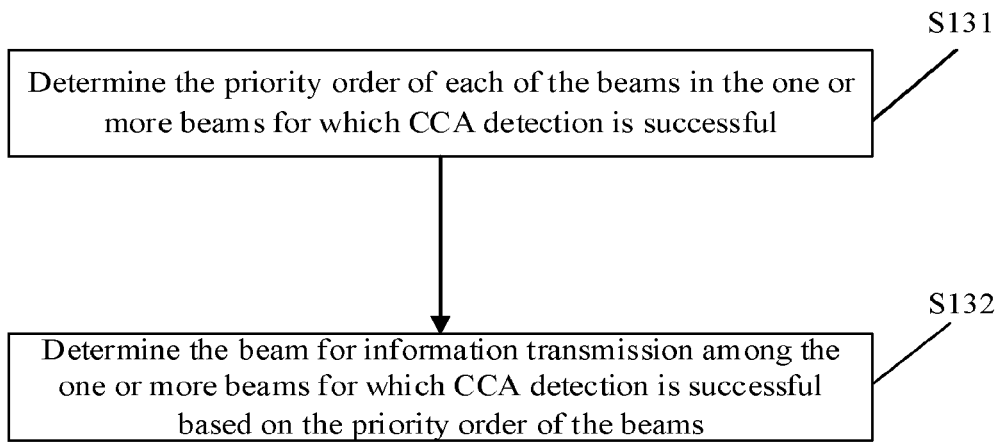
FIG. 3 is a flowchart of a method for determining a beam transmitting information according to an example embodiment.

FIG. 3 is a schematic flowchart showing determination of the beam for information transmission according to an example embodiment of the present disclosure. Referring to FIG. 3, the following steps S131 and step S132 are included.

In step S131, the priority order of each of the beams in the one or more beams for which CCA detection is successful is determined.

In an embodiment of the disclosure, the priority order of each of the beams may be determined based on the index of the beam.

In step S132, the beam for information transmission is determined among the one or more beams for which CCA detection is successful based on the priority order of the beams.

In an embodiment of the present disclosure, the beam corresponding to the highest priority order may be selected for information transmission (the beam with the highest priority order is used for information transmission). For example, the beam with the lowest beam index among the one or more beams for which CCA detection is successful is selected for information transmission.

In one example, for SPS PDSCH, the multiple beams for which CCA detection is to be performed are configured by the network device using RRC layer signaling. The plurality of beams configured by the network device using the RRC layer signaling have a priority order among them, e.g., the priority order is represented by the beam index. When the network device performs CCA detection separately for each beam of the plurality of beams and there exists one or more beams for which CCA detection is successful, the network device may select the beam with the highest priority order among the beams to transmit the information, e.g., the network device selects the beam with the smallest beam index to transmit the information.

In another example, for CG-PUSCH, the multiple beams for which CCA detection is to be performed are configured by the network device using RRC layer signaling. The plurality of beams configured by the network device using the RRC layer signaling have a priority order among them, e.g., the priority order is represented by the beam index.

When the network device performs CCA detection separately for each beam of the plurality of beams and there exists one or more beams for which CCA detection is successful, the network device may select the beam with the highest priority order among the beams to transmit the information, e.g., the network device selects the beam with the smallest beam index to transmit the information.

In another example, for dynamically scheduled PDSCH, the multiple beams for which CCA detection is to be performed are specified by the network device using DCI scheduling the PDSCH. The plurality of beams specified by the network device using DCI have a priority order among them, e.g., the priority order is represented by the beam index. When the network device performs CCA detection separately for each beam of the plurality of beams and there exists one or more beams for which CCA detection is successful, the network device may select the beam with the highest priority order among the beams to transmit the information, e.g., the network device selects the beam with the smallest beam index to transmit the information.

In another example, for dynamically scheduled PUSCH, the multiple beams for which CCA detection is to be performed are specified by the network device using DCI scheduling the PUSCH. The plurality of beams specified by the network device using the DCI have a priority order among them, e.g., the priority order is represented by the beam index. When the terminal performs CCA detection separately for each beam of the plurality of beams and there exists one or more beams for which CCA detection is successful, the terminal device may select the beam with the highest priority order among the beams to transmit the information, e.g., the terminal device selects the beam with the smallest beam index to transmit the information.

In another example, for a PDCCH channel, the multiple beams for which CCA detection is to be performed are configured by the network device using MAC layer signal or RRC layer signaling. The plurality of beams configured by the network device using the MAC layer signaling or RRC layer signaling have a priority order among them, e.g., the priority order is represented by the beam index. When the network device performs CCA detection separately for each beam of the plurality of beams and there exists one or more beams for which CCA detection is successful, the network device may select the beam with the highest priority order among the beams to transmit the information, e.g., the network device selects the beam with the smallest beam index to transmit the information.

In another example, for a PUCCH channel, the multiple beams for which CCA detection is to be performed are configured by the network device using MAC layer signaling or RRC layer signaling. The plurality of beams configured by the network device using the MAC layer signal or the RRC layer signaling have a priority order among them, e.g., the priority order is represented by the beam index. When the terminal device performs CCA detection separately for each beam of the plurality of beams and there exists one or more beams for which CCA detection is successful, the terminal device may select the beam with the highest priority order among the beams to transmit the information, e.g., the terminal device selects the beam with the smallest beam index to transmit the information.

In the information transmission method provided in the embodiments of the present disclosure, a plurality of beams are determined for CCA detection. CCA detection is performed in a beam direction corresponding to each beam of the plurality of beams. Thus, the success rate of CCA detection can be improved. By determining the beam for information transmission among one or more beams for which CCA detection is successful and transmitting information based on the determined beam, the probability of smooth information transmission can be increased. The information transmission method can be applied in a scenario where the transmitting end has multiple beams and performs transmission of low latency service information on unlicensed frequency bands, such as performing transmission of URLLC service information.

In embodiments of the present disclosure, the transmitting end (a terminal or a network device) performs CCA detection based on multiple beams and transmits information on a beam for which CCA detection is successful. The receiving end (the network device or the terminal) can receive information based on the configured multiple beams.

Based on the same idea, embodiments of the present disclosure also provide an information transmission device.

It should be understood that, in order to achieve the aforementioned functions, the information transmission device provided by embodiments of the present disclosure contains hardware structures and/or software modules corresponding to the respective functions. In combination with the units and algorithmic steps of each example disclosed in the embodiments of the present disclosure, the embodiments of the present disclosure can be implemented in the form of hardware or a combination of hardware and computer software. Whether a particular function is implemented in hardware or computer software driving hardware depends on the particular application and design constraints of the technical solutions. A person skilled in the art may use a different approach for each particular application to implement the described functions, and such implementation should not be considered as outside the scope of the technical solutions of the embodiments of the present disclosure.

Figure 4:
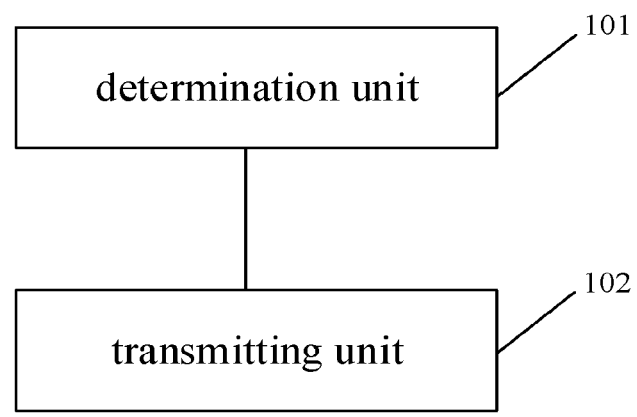
FIG. 4 is a block diagram of an information transmission device according to an example embodiment.

FIG. 4 is a block diagram of an information transmission device according to an example embodiment. Referring to FIG. 4, the information transmission device 100 includes a determination unit 101 and a transmitting unit 102.

The determination unit 101 is configured to determine a plurality of beams for which clear channel assessment detection is to be performed, and based on each beam of the plurality of beams, perform clear channel assessment detection in a beam direction corresponding to each beam; and in response to presence of one or more beams among the plurality of beams for which the clear channel assessment detection is successful, determine a beam for transmitting information among the one or more beams for which the clear channel assessment detection is successful. The transmitting unit 102 is configured to transmit the information based on the determined beam for transmitting the information.

In an implementation, there exists a priority order among the plurality of beams; the determination unit 101 is configured to determine the beam for transmitting the information among the one or more beams for which the clear channel assessment detection is successful by: based on the priority order, determining the beam for transmitting the information among the one or more beams for which the clear channel assessment detection is successful.

In another implementation, the priority order is determined based on a beam index.

In another implementation, a priority order with a smaller index is higher than a priority order with a larger index.

In another implementation, the beam for transmitting the information is a beam corresponding to a highest priority order.

In another implementation, the determination unit 101 is configured to determine the plurality of beams for which clear channel assessment detection is to be performed by: based on configuration information of a network device, determining the plurality of beams for which clear channel assessment detection is to be performed.

In another implementation, the information includes information of semi-persistent scheduling physical downlink shared channel, and the configuration information includes information configured by radio resource control signaling; or the information includes information of configured grant physical uplink shared channel, and the configuration information includes information configured by the radio resource control signaling; or the information includes information of dynamically scheduled physical downlink shared channel, and the configuration information includes downlink control signaling for scheduling the physical downlink shared channel; or the information includes information of a physical downlink control channel, and the configuration information includes information configured by medium access control signaling or radio resource control signaling; or the information includes information of a physical uplink control channel, and the configuration information includes information configured by the medium access control signaling or the radio resource control signaling.

Regarding the devices in the above embodiments, the specific way in which each module performs its operation has been described in detail in the embodiments of the methods, and detailed descriptions will be omitted here.

Figure 5:
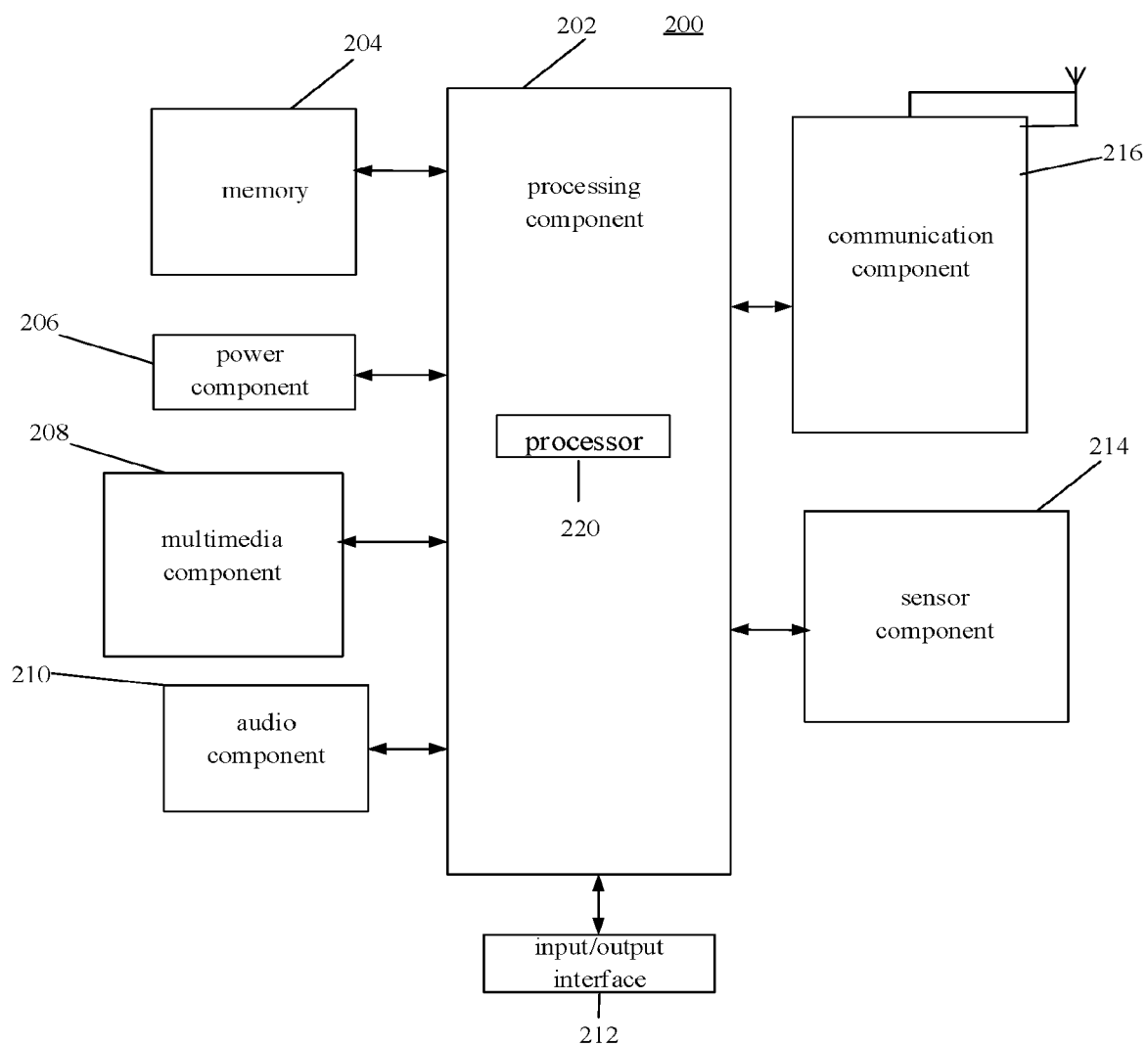
FIG. 5 is a block diagram of a device for transmitting information according to an example embodiment.

FIG. 5 is a block diagram of a device 200 for transmitting information according to an example embodiment. For example, the device 200 may be a mobile phone, a computer, a digital broadcast terminal, a messaging device, a gaming console, a tablet, a medical device, exercise equipment, a personal digital assistant, and the like.

Referring to FIG. 5, the device 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 may include a power management system, one or more power sources, and any other components associated with the generation, management, and distribution of power in the device 200.

The multimedia component 208 includes a screen providing an output interface between the device 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and the rear camera may receive an external multimedia datum while the device 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone ("MIC") configured to receive an external audio signal when the device 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the device 200. For instance, the sensor component 214 may detect an open/closed status of the device 200, relative positioning of components, e.g., the display and the keypad, of the device 200, a change in position of the device 200 or a component of the device 200, a presence or absence of user contact with the device 200, an orientation or an acceleration/deceleration of the device 200, and a change in temperature of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 can access a wireless network based on a communication standard, such as WiFi, 2G, or 3G, or a combination thereof. In one example embodiment, the communication component 216 receives a broadcast signal or broadcast associated information from an external broadcast management system via a broadcast channel. In one example embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer-readable storage medium including instructions, such as included in the memory 204, executable by the processor 220 in the device 200, for performing the above-described methods. For example, the non-transitory computer-readable storage medium may be a ROM, a RAM, a CD-ROM, a magnetic tape, a floppy disc, an optical data storage device, and the like.

Figure 6:
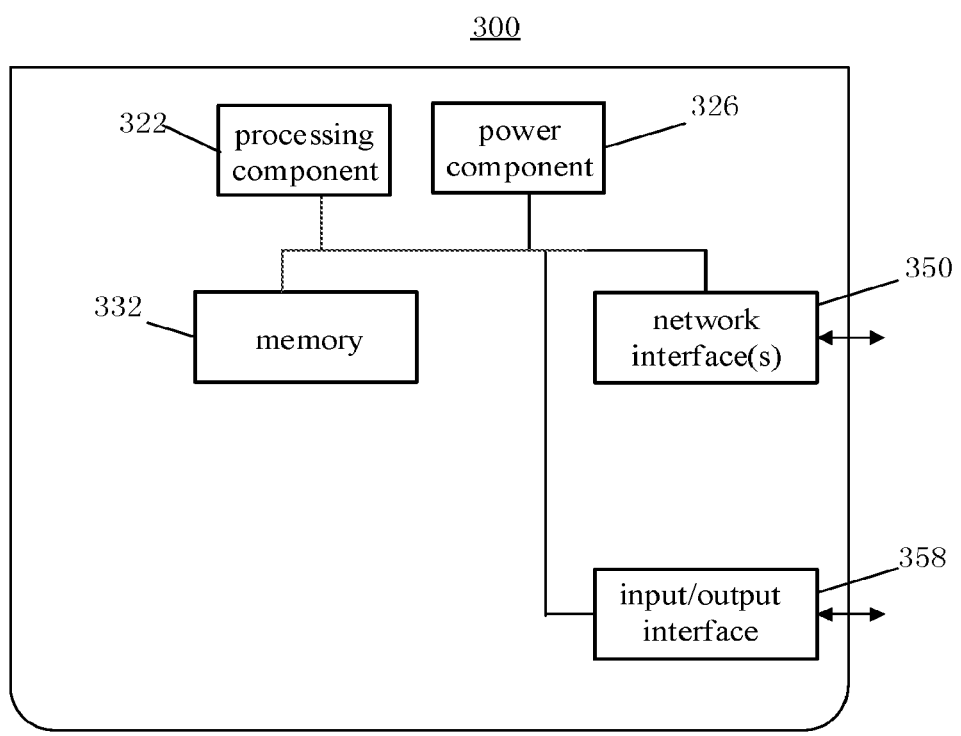
FIG. 6 is a block diagram of a device for transmitting information according to an example embodiment.

FIG. 6 is a block diagram of a device 300 for transmitting information according to an example embodiment. For example, the device 300 may be provided as a network device, such as a base station. Referring to FIG. 5, the device 300 includes a processing component 222 that further includes one or more processors, and memory resources represented by a memory 332 for storing instructions executable by the processing component 322, such as application programs. The application programs stored in the memory 332 may include one or more modules each corresponding to a set of instructions. Further, the processing component 322 is configured to execute the instructions to perform the above described method.

The device 300 may also include a power component 326 configured to perform power management of the device 300, wired or wireless network interface(s) 350 configured to connect the device 300 to a network, and an input/output (I/O) interface 358. The device 300 may operate based on an operating system stored in the memory 332, such as Windows Server™, Mac OS X™, Unix™, Linux™, FreeBSD™, or the like.

In an example embodiment, there is provided a non-transitory computer-readable storage medium having stored therein instructions, e.g., the memory 332 including instructions. The instructions may be executed by the processing component 322 of the device 300 to perform the above methods. For example, the non-transitory computer-readable storage medium may be ROM, Random Access Memory (RAM), CD-ROM, a magnetic tape, a floppy disk, or an optical data storage device and so on.

It is understood that the term "plurality" in the present disclosure refers to two or more, and other quantifiers are similar. The word "and/or" describes a relationship of associated objects, indicating that there can be three relationships, for example, A and/or B means: A alone, B alone, and A and B together. The character "/" generally indicates that the associated objects before and after "/" is in an "or" relationship. The singular forms "a/an", "said" and "the" are also intended to include plural forms, unless the context clearly indicates otherwise.

It is further understood that the terms "first", "second", etc. are used to describe a variety of information, but the variety of information should not be limited to these terms. These terms are used only to distinguish information of the same type from one another and do not indicate a particular order or level of importance. In fact, the expressions "first" and "second" can be used interchangeably. For example, without departing from the scope of the present disclosure, first information may also be referred to as second information, and similarly, second information may also be referred to as first information.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Embodiments of the present disclosure provide an information transmission method, an information transmission device and a storage medium. The technical solutions are as follows.

According to a first aspect of embodiments of the present disclosure, there is provided an information transmission method, including: determining a plurality of beams for which clear channel assessment detection is to be performed; based on each beam of the plurality of beams, performing clear channel assessment detection in a beam direction corresponding to each beam; and determining a beam for transmitting information among one or more beams for which the clear channel assessment detection is successful, and transmitting the information, wherein the one or more beams for which the clear channel assessment detection is successful are present among the plurality of beams.

In some embodiments of the present disclosure, there exists a priority order among the plurality of beams;
wherein determining the beam for transmitting the information among the one or more beams for which the clear channel assessment detection is successful, includes: based on the priority order, determining the beam for transmitting the information among the one or more beams for which the clear channel assessment detection is successful.

In some embodiments of the present disclosure, the priority order is determined based on a beam index.

In some embodiments of the present disclosure, a priority order with a smaller index is higher than a priority order with a larger index.

In some embodiments of the present disclosure, the beam for transmitting the information is a beam corresponding to a highest priority order.

In some embodiments of the present disclosure, determining the plurality of beams for which clear channel assessment detection is to be performed, includes: based on configuration information of a network device, determining the plurality of beams for which clear channel assessment detection is to be performed.

In some embodiments of the present disclosure, the information includes information of semi-persistent scheduling physical downlink shared channel, and the configuration information includes information configured by radio resource control signaling; or the information includes information of configured grant physical uplink shared channel, and the configuration information includes information configured by the radio resource control signaling; or the information includes information of dynamically scheduled physical downlink shared channel, and the configuration information includes downlink control signaling for scheduling the physical downlink shared channel; or the information includes information of a physical downlink control channel, and the configuration information includes information configured by medium access control signaling or radio resource control signaling; or the information includes information of a physical uplink control channel, and the configuration information includes information configured by the medium access control signaling or the radio resource control signaling.

According to a second aspect of embodiments of the present disclosure, there is provided an information transmission device, including:

a determination unit configured to determine a plurality of beams for which clear channel assessment detection is to be performed, and based on each beam of the plurality of beams, perform clear channel assessment detection in a beam direction corresponding to each beam; and determine a beam for transmitting information among the one or more beams for which the clear channel assessment detection is successful; and a transmitting unit configured to transmit the information based on the determined beam for transmitting the information, wherein the one or more beams for which the clear channel assessment detection is successful are present among the plurality of beams.

In some embodiments of the present disclosure, there exists a priority order among the plurality of beams; wherein the determination unit is configured to determine the beam for transmitting the information among the one or more beams for which the clear channel assessment detection is successful by: based on the priority order, determining the beam for transmitting the information among the one or more beams for which the clear channel assessment detection is successful.

In some embodiments of the present disclosure, the priority order is determined based on a beam index.

In some embodiments of the present disclosure, a priority order with a smaller index is higher than a priority order with a larger index.

In some embodiments of the present disclosure, the beam for transmitting the information is a beam corresponding to a highest priority order.

In some embodiments of the present disclosure, the determination unit is configured to determine the plurality of beams for which clear channel assessment detection is to be performed by: based on configuration information of a network device, determining the plurality of beams for which clear channel assessment detection is to be performed.

In some embodiments of the present disclosure, the information includes information of semi-persistent scheduling physical downlink shared channel, and the configuration information includes information configured by radio resource control signaling; or the information includes information of configured grant physical uplink shared channel, and the configuration information includes information configured by the radio resource control signaling; or the information includes information of dynamically scheduled physical downlink shared channel, and the configuration information includes downlink control signaling for scheduling the physical downlink shared channel; or the information includes information of a physical downlink control channel, and the configuration information includes information configured by medium access control signaling or radio resource control signaling; or the information includes information of a physical uplink control channel, and the configuration information includes information configured by the medium access control signaling or the radio resource control signaling.

According to a third aspect of embodiments of the present disclosure, there is provided an information transmission device, including:

a processor; and a memory storing instructions executable by the processor;

wherein the processor is configured to perform the information transmission method according to the first aspect or any implementation of the first aspect.

According to a fourth aspect of embodiments of the present disclosure, there is provided a non-transitory computer readable storage medium, wherein when instructions in the storage medium are executed by a processor of a mobile terminal or a network device, the mobile terminal or the network device is caused to perform the information transmission method according to the first aspect or any implementation of the first aspect.

The technical solutions provided by embodiments of the present disclosure can include the following beneficial effects. A plurality of beams are determined for clear channel assessment detection. Clear channel assessment detection is performed in a beam direction corresponding to each beam of the plurality of beams. Thus, the success rate of clear channel assessment detection can be improved. By transmitting information on the beam for which the clear channel assessment detection is successful, the probability of smooth information transmission can be increased.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An information transmission method, comprising:
determining, by a terminal, a plurality of beams for which clear channel assessment detection is to be performed according to configuration information configured by a network through Radio Resource Control (RRC) signaling, wherein a priority of a beam with a smaller index is given a higher ranking than a priority of a beam with a larger index;
based on each beam of the plurality of beams, performing, by the terminal, clear channel assessment detection in a beam direction corresponding to each beam;
determining, by the terminal, priority orders of one or more beams for which clear channel assessment detection is successful;
determining, by the terminal, a beam with the smallest beam index from the one or more beams for which the clear channel assessment detection is successful, and transmitting information of configured grant physical uplink shared channel (CG-PUSCH) on the beam with the smallest beam index to the network device in an unlicensed band; and receiving, by the terminal, an adjusted priority order, in which an index of a beam is adjusted by the network device to be an index which is lower than that before adjustment of the priority order according to information transmission effect.

2. The information transmission method according to claim 1, wherein determining the plurality of beams for which clear channel assessment detection is to be performed, comprises:
determining the plurality of beams for which clear channel assessment detection is to be performed based on configuration information of a network device.

3. The information transmission method according to claim 2, wherein:
the information comprises information of the CG-PUSCH, and the configuration information comprises information configured by the RRC signaling.

4. An information transmission device, comprising:
a processor; and
a memory, configured to store executable instructions of the processor;
wherein the processor is configured to load and execute the executable instructions to:
determine a plurality of beams for which clear channel assessment detection is to be performed according to configuration information configured by a network through Radio Resource Control (RRC) signaling, wherein a priority of a beam with a smaller index is given a higher ranking than a priority of a beam with a larger index, and based on each beam of the plurality of beams, perform clear channel assessment detection in a beam direction corresponding to each beam; determine priority orders of one or more beams for which clear channel assessment detection is successful; and determine, a beam with the smallest beam index from the one or more beams for which the clear channel assessment detection is successful; and
transmit information of configured grant physical uplink shared channel (CG-PUSCH) on the beam with the smallest beam index to the network device in an unlicensed band; and
receive an adjusted priority order, in which an index of a beam is adjusted by the network device to be an index which is lower than that before adjustment of the priority order according to information transmission effect.

5. The information transmission device according to claim 4, wherein the processor is configured to:
determine the plurality of beams for which clear channel assessment detection is to be performed based on configuration information of a network device.

6. The information transmission device according to claim 5, wherein:
the information comprises information of the CG-PUSCH, and the configuration information comprises information configured by the RRC signaling.

7. A non-transitory computer readable storage medium, wherein when instructions in the storage medium are executed by a processor of a mobile terminal or a network device, the mobile terminal or the network device is caused to perform an information transmission method comprising:
determining a plurality of beams for which clear channel assessment detection is to be performed according to configuration information configured by a network through Radio Resource Control (RRC) signaling, wherein a priority of a beam with a smaller index is given a higher ranking than a priority of a beam with a larger index;
based on each beam of the plurality of beams, performing clear channel assessment detection in a beam direction corresponding to each beam;
determining priority orders of one or more beams for which clear channel assessment detection is successful;
determining a beam with the smallest beam index from the one or more beams for which the clear channel assessment detection is successful, and transmitting of configured grant physical uplink shared channel (CG-PUSCH) on the beam with the smallest beam index to the network device in an unlicensed band; and
receiving an adjusted priority order, in which an index of a beam is adjusted by the network device to be an index which is lower than that before adjustment of the priority order according to information transmission effect.

8. The non-transitory computer readable storage medium according to claim 7, wherein determining the plurality of beams for which clear channel assessment detection is to be performed, comprises:
determining the plurality of beams for which clear channel assessment detection is to be performed, based on configuration information of a network device.

9. The non-transitory computer readable storage medium according to claim 8, wherein the information comprises information of the CG-PUSCH, and the configuration information comprises information configured by the RRC signaling.

* * * * *